May 20, 1941.    W. N. OLSON    2,242,800
ELECTRIC MOTOR
Filed May 15, 1939

Inventor:
Waldemar N. Olson
By: Brayton Richards
Attorney

Patented May 20, 1941

2,242,800

UNITED STATES PATENT OFFICE 2,242,800

ELECTRIC MOTOR

Waldemar N. Olson, Brookfield, Ill., assignor to Reynolds Electric Co., Chicago, Ill., a corporation of Illinois Application May 15, 1939, Serial No. 273,694

1 Claim. (Cl. 172—275)

The invention relates to improvements in electric motors and has for its primary object the provision of an operative circuit so connected with the field winding of the motor as to maintain a substantially constant voltage in said operative circuit so as to adapt said circuit for use for illuminating or other purposes where a substantially constant voltage is desirable.

Other objects will appear hereinafter.

The invention consists in the arrangements and combinations of parts hereinafter described and claimed.

The invention will be best understood by reference to the accompanying drawing forming a part of this specification and in which.

Figure 1:
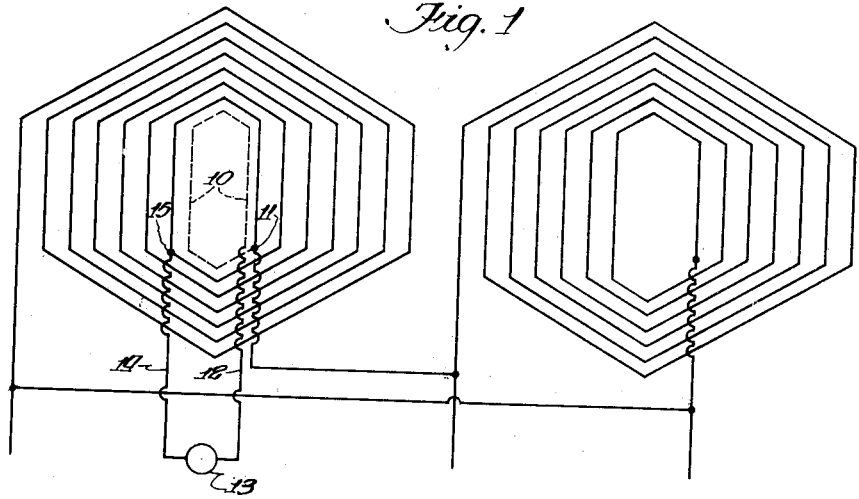
Fig. 1 is a diagrammatic view of the stator winding of one form of electric motor showing a lighting circuit so connected therewith as to maintain a substantially constant voltage therein.
Figure 2:
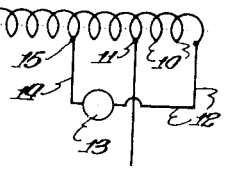
Fig. 2 is a simplified diagrammatic view illustrating more clearly the electrical operation of the lighting circuit.

In the embodiment of the invention illustrated in Figs. 1 and 2, additional turns or coils 10 are added to the inner terminal of the stator winding of one pole of an ordinary concentric wound two pole one phase parallel connected electric motor, said additional turns 10 being connected with the normal winding at the point 11 as shown. The inner end of the turns 10 is connected by the wire 12 with one side of a low voltage electric light bulb 13, the other side of which is connected by wire 14 with the normal winding of the corresponding stator at the point 15. As will be readily understood by those skilled in this art, the connections of the lighting circuit are such that as the voltage in the turns represented by the lines from 11 to 15 increases, the voltage in the turns 10 decreases when the motor is loaded. This compensating action of the two sections of coils is probably due to the fact that the rotor induces counter voltage therein which is out of phase with the impressed voltage. The number of turns in the two sections are made such as to be complementary to each other and are in such proportion as to maintain the voltage in the lighting circuit substantially constant while the motor is operating under variable conditions of load as will be readily understood. Thus an arrangement is provided whereby a low voltage lighting or other circuit may be so connected with a normal stator winding of the motor that a substantially constant voltage will be maintained therein and thereby flickering of the light, when employed as a lighting circuit, prevented. In this way a satisfactory lighting circuit may be readily provided for use in conjunction with a machine driven by the motor without additional electrical connections or appliancs.

The arrangement is such that the number of stator poles employed in the motor with which the operating circuit is connected is immaterial and if desired, where a multiple pole motor is employed, the lighting circuit may be formed and connected with the windings of opposite poles and thus the ampere load divided to avoid any electro-magnetic unbalance as will be readily understood by those skilled in this art.

Figure 3:
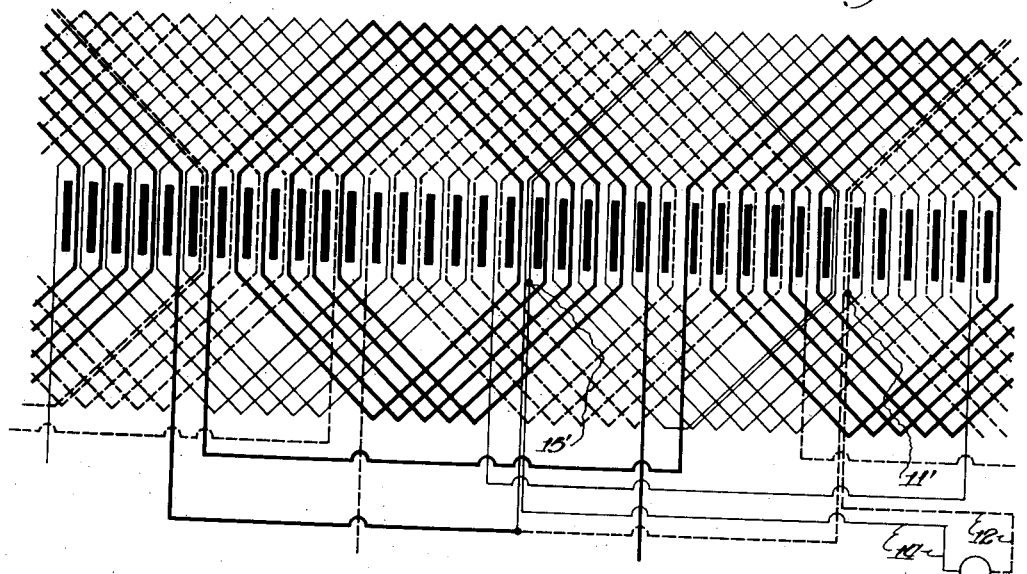
Fig. 3 is a diagrammatic view of the winding for a two pole, three phase electric motor having a lighting circuit so connected therewith as to provide a substantially constant voltage therein.
Figure 4:
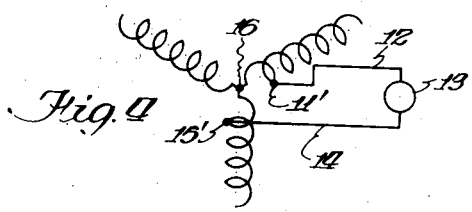
Fig. 4 is a simplified diagrammatic view illustrating more clearly the electrical operation of the lighting circuit shown in Fig. 3.

In the embodiment of the invention illustrated in Figs. 3 and 4, one wire 12 of the lighting circuit is connected at point 11' with one of the coils of a polar group of an ordinary three phase two pole series star connected stator winding, and the other wire 14 of the lighting circuit connected at the point 15' with another coil of another polar group of said winding thus causing the sections of turns or coils 11'—16 to serve as complementary turns to the turns in the section 15'—16, and thereby maintaining the voltage in the lighting circuit substantially constant as before.

While I have illustrated and described the preferred forms of construction for carrying the invention into effect, these are capable of variation and modification without departing from the spirit of the invention. I therefore do not wish to be limited to the precise details of construction and operation herein described but desire to avail myself of such variations and modifications as fall within the scope of the appended claim.

I claim:

A single-phase alternating current motor having a slotted stator and a rotor; a main stator winding including connected polar groups of coils, the coils of each group varying in span and being disposed concentrically in different stator slots, said motor winding being tapped for an auxiliary lighting circuit at a point adjacent its inner end to span, from its inner end, sufficient turns to furnish a part of the voltage desired for said lighting circuit; additional turns forming a continuation of the inner end of the main winding and including sufficient turns to furnish, by induction, the other part of the desired voltage for said lighting circuit; and an auxiliary lighting circuit connected at said tapped point of said main winding and to the end of said additional turns remote from said main winding.

WALDEMAR N. OLSON.